United States Patent
Bent et al.

(10) Patent No.: US 8,285,710 B2
(45) Date of Patent: Oct. 9, 2012

(54) AUTOMATED QUERY PATH REPORTING IN DISTRIBUTED DATABASES

(75) Inventors: Graham A. Bent, Southampton (GB); Patrick Dantressangle, Ford (GB); David R. Vyvyan, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/248,170

(22) Filed: Oct. 9, 2008

(65) Prior Publication Data

US 2010/0094862 A1   Apr. 15, 2010

(51) Int. Cl.
*G06F 7/00* (2006.01)
(52) U.S. Cl. ........ 707/716; 707/758; 707/769; 709/224; 709/239; 709/240; 709/241; 709/242
(58) Field of Classification Search .................. None
See application file for complete search history.

(56) References Cited

U.S. PATENT DOCUMENTS

| | | | |
|---|---|---|---|
| 5,201,046 A | 4/1993 | Goldberg et al. | |
| 5,295,256 A | 3/1994 | Bapat | |
| 5,408,652 A | 4/1995 | Hayashi et al. | |
| 5,418,950 A | 5/1995 | Li et al. | |
| 5,701,453 A | 12/1997 | Maloney et al. | |
| 5,794,229 A | 8/1998 | French et al. | |
| 5,873,088 A | 2/1999 | Hayashi et al. | |
| 5,937,402 A | 8/1999 | Pandit | |
| 6,016,497 A | 1/2000 | Suver | |
| 6,175,837 B1 | 1/2001 | Sharma et al. | |
| 6,226,788 B1 | 5/2001 | Schoening et al. | |
| 6,457,007 B1 | 9/2002 | Kikuchi et al. | |
| 6,694,306 B1 | 2/2004 | Nishizawa et al. | |
| 6,708,186 B1 | 3/2004 | Claborn et al. | |
| 6,950,823 B2 | 9/2005 | Amiri et al. | |
| 7,251,653 B2 | 7/2007 | Huang et al. | |
| 7,403,956 B2 | 7/2008 | Vaschillo et al. | |
| 7,664,758 B1 | 2/2010 | Urano et al. | |
| 7,752,213 B2 | 7/2010 | Todd | |
| 7,921,131 B2 | 4/2011 | Uppala | |
| 7,974,961 B2 | 7/2011 | Barbarek | |
| 8,051,213 B2 | 11/2011 | Van Hensbergen et al. | |
| 2004/0044727 A1* | 3/2004 | Abdelaziz et al. ............ 709/203 |
| 2005/0065925 A1 | 3/2005 | Weissman et al. | |

(Continued)

OTHER PUBLICATIONS

"Routing discovery optimization for dynamic source routing in mobile ad hoc networks", Boon-Chong Seet, Bu-Sung Lee and Chiew-Tong Lau, Sep. 15, 2000, School of Computer Engineering, Nanyang Technology University, Singapore.*

(Continued)

*Primary Examiner* — Fred I Ehichioya
*Assistant Examiner* — Hasanul Mobin
(74) *Attorney, Agent, or Firm* — Lee Law, PLLC; Christopher B. Lee

(57) ABSTRACT

A database query comprising a logical table definition and at least one route tracing indicator is forwarded to at least one distributed database node within a distributed network of databases. At least one query response is received including distributed route tracing information associated with each distributed database node that processed the database query along a path associated with the at least one query response. The received distributed route tracing information is processed to characterize query route propagation within the distributed network of databases. This abstract is not to be considered limiting, since other embodiments may deviate from the features described in this abstract.

16 Claims, 8 Drawing Sheets

U.S. PATENT DOCUMENTS

| | | | |
|---|---|---|---|
| 2005/0096124 | A1 | 5/2005 | Stronach |
| 2005/0138073 | A1 | 6/2005 | Zhou et al. |
| 2005/0182758 | A1 | 8/2005 | Seitz et al. |
| 2005/0223022 | A1* | 10/2005 | Weissman et al. ............ 707/102 |
| 2005/0246338 | A1 | 11/2005 | Bird |
| 2006/0004750 | A1 | 1/2006 | Huang et al. |
| 2006/0053112 | A1 | 3/2006 | Chitikara et al. |
| 2006/0136363 | A1 | 6/2006 | Nguyen et al. |
| 2006/0136469 | A1 | 6/2006 | Dettinger et al. |
| 2006/0225072 | A1 | 10/2006 | Lari et al. |
| 2006/0294065 | A1 | 12/2006 | Dettinger et al. |
| 2007/0002869 | A1* | 1/2007 | Miller ...................... 370/395.32 |
| 2007/0143369 | A1 | 6/2007 | Uppala |
| 2009/0063453 | A1 | 3/2009 | Adler et al. |
| 2009/0063524 | A1 | 3/2009 | Adler et al. |
| 2009/0193006 | A1 | 7/2009 | Herrnstadt |

OTHER PUBLICATIONS

United States Patent and Trademark Office, Office Action for U.S. Appl. No. 12/248,082, Jan. 4, 2011, pp. 1-19, Alexandria, VA, USA.

United States Patent and Trademark Office, Office Action for U.S. Appl. No. 12/248,082, Apr. 27, 2011, pp. 1-22, Alexandria, VA, USA.

United States Patent and Trademark Office, Office Action for U.S. Appl. No. 12/248,140, Apr. 13, 2011, pp. 1-15, Alexandria, VA, USA.

United States Patent and Trademark Office, Office Action for U.S. Appl. No. 12/248,109, Mar. 1, 2011, pp. 1-13, Alexandria, VA, USA.

United States Patent and Trademark Office, Office Action for U.S. Appl. No. 12/248,241, May 13, 2011, pp. 1-28, Alexandria, VA, USA.

United States Patent and Trademark Office, Office Action for U.S. Appl. No. 12/248,304, Apr. 1, 2011, pp. 1-19, Alexandria, VA, USA.

United States Patent and Trademark Office, Notice of Allowance for U.S. Appl. No. 12/248,082, Nov. 30, 2011, pp. 1-14, Alexandria, VA, USA.

United States Patent and Trademark Office, Office Action for U.S. Appl. No. 12/248,109, Sep. 1, 2011, pp. 1-20, Alexandria, VA, USA.

United States Patent and Trademark Office, Office Action for U.S. Appl. No. 12/248,109, Dec. 7, 2011, pp. 1-18, Alexandria, VA, USA.

United States Patent and Trademark Office, Office Action for U.S. Appl. No. 12/248,140, Oct. 13, 2011, pp. 1-18, Alexandria, VA, USA.

United States Patent and Trademark Office, Office Action for U.S. Appl. No. 12/248,241, Nov. 9, 2011, pp. 1-33, Alexandria, VA, USA.

United States Patent and Trademark Office, Office Action for U.S. Appl. No. 12/248,304, Sep. 19, 2011, pp. 1-25, Alexandria, VA, USA.

Roy Morien, Agile Development of the Database: A Focal Entity Prototyping Approach, Proceedings of the Agile Development Conference (ADC '05), 2005, pp. 103-110 (1-8), IEEE Computer Society, Published on the World Wide Web.

Joseph Sack, SQL Server 2008 Transact-SQL Recipes: Chapter 4—Tables, Book, Jul. 25, 2008, pp. 143-195, Springer-Verlag New York, Inc., New York, NY, USA.

United States Patent and Trademark Office, Office Action for U.S. Appl. No. 12/248,109, May 8, 2012, pp. 1-22, Alexandria, VA, USA.

United States Patent and Trademark Office, Office Action for U.S. Application No. 12/248,241, Apr. 26, 2012, pp. 1-53, Alexandria, VA, USA.

United States Patent and Trademark Office, Office Action for U.S. Appl. No. 12/248,304, Jun. 19, 2012, pp. 1-21, Alexandria, VA, USA.

United States Patent and Trademark Office, Office Action for U.S. Appl. No. 13/364,728, Jun. 12, 2012, pp. 1-34, Alexandria, VA, USA.

United States Patent and Trademark Office, Notice of Allowance for U.S. Appl. No. 12/248,140, Jun. 21, 2012, pp. 1-30, Alexandria, VA, USA.

* cited by examiner

600

AUTOMATED QUERY PATH REPORTING IN DISTRIBUTED DATABASES

This invention was made with Government support under W911NF-06-3-0001 awarded by United States Army. The Government has certain rights to this invention.

RELATED APPLICATIONS

This application is related to the application titled "AUTOMATED PROPAGATION OF NON-CONFLICTING QUERIES IN DISTRIBUTED DATABASES," filed contemporaneously herewith on Oct. 9, 2008, and assigned application Ser. No. 12/248,082, to the application titled "AUTOMATED DATA SOURCE ASSURANCE IN DISTRIBUTED DATABASES," filed contemporaneously herewith on Oct. 9, 2008, and assigned application Ser. No. 12/248,109, to the application titled "AUTOMATED DATA CONVERSION AND ROUTE TRACKING IN DISTRIBUTED DATABASES," filed contemporaneously herewith on Oct. 9, 2008, and assigned application Ser. No. 12/248,140, to the application titled "DYNAMIC CONTEXT DEFINITIONS IN DISTRIBUTED DATABASES," filed contemporaneously herewith on Oct. 9, 2008, and assigned application Ser. No. 12/248,241, and to the application titled "NODE-LEVEL SUB-QUERIES IN DISTRIBUTED DATABASES," filed contemporaneously herewith on Oct. 9, 2008, and assigned application Ser No. 12/248,304, each of which is hereby incorporated by reference as if fully set forth herein.

This application is also related to the application titled "AN APPARATUS FOR PROPAGATING A QUERY," filed in the United Kingdom on Sep. 19, 2007, with application serial number 0718251.2, the application titled "AN APPARATUS FOR STORING A LOGICAL STATEMENT," filed in the United Kingdom on Sep. 19, 2007, with application serial number 0718214.0, and the application titled "AN APPARATUS FOR ENABLING CONNECTIONS," filed in the United Kingdom on Sep. 19, 2007, with application serial number 0718248.8 and filed within the United States on Apr. 11, 2008, with application Ser. No. 12/101,220, each of which is hereby incorporated by reference as if fully set forth herein.

BACKGROUND OF THE INVENTION

1. Field of the Invention

The present invention relates to systems and methods for determining query paths in ad-hoc distributed database systems. More particularly, the present invention relates to automated query path reporting in distributed databases.

2. Related Art

Distributed databases include multiple databases accessible via a network or other interconnection by a querying computing node. The distributed databases may be logically distributed across multiple access or network domains and may be geographically distributed across physical locations. The querying computing node often uses a centralized registry to identify databases and physical data structures within the identified databases. The physical data structures are identified and accessible globally by name. Queries are issued to an identified database using an identified global name of a physical data structure. Query results are returned from the identified database in response to the issued query.

BRIEF SUMMARY OF THE INVENTION

The subject matter described herein provides automated query path reporting in ad-hoc distributed databases. For purposes of the present subject matter, "ad-hoc" encompasses systems that are fit for purposes of the present subject matter with any kind of connection strategy that may be employed. A logical data structure (e.g., table) and at least one route tracing indicator are transmitted in association with a distributed database query. A route tracing indicator includes an identifier instructing a processing node to obtain route tracing information, such as "from node," "to node," depth, precedence, and row count identifiers. A query response is received including distributed route tracing information associated with each distributed database node that processed the database query. The distributed route tracing information may include a query depth and a row count of the query for each node. The query may be received from more than one path at any node and route arrival precedence information may be determined and appended to the distributed route tracing information. The received distributed route tracing information is processed to characterize dynamic query route propagation, in one example by aggregating the received distributed route tracing information. The characterized dynamic query route propagation may be further translated into a graphical route tracing representation. Further analysis may be performed on the dynamic query route propagation to evaluate query propagation loops or other query propagation characteristics within the distributed database system.

A method includes forwarding a database query comprising a logical table definition and at least one route tracing indicator to at least one distributed database node within a distributed network of databases; receiving at least one query response comprising distributed route tracing information associated with each distributed database node that processed the database query along a path associated with the at least one query response; and processing the received distributed route tracing information to characterize query route propagation within the distributed network of databases.

A system includes a memory adapted to store data path query reporting information; and a processor programmed to: forward a database query comprising a logical table definition and at least one route tracing indicator to at least one distributed database node within a distributed network of databases, receive at least one query response comprising distributed route tracing information associated with each distributed database node that processed the database query along a path associated with the at least one query response; process the received distributed route tracing information to characterize query route propagation within the distributed network of databases, and store the processed distributed route tracing information to the memory.

An alternative system includes a memory adapted to store data path query reporting information; and a processor programmed to: forward a database query comprising a logical table definition and at least one route tracing indicator to at least one distributed database node within a distributed network of databases, receive at least one query response comprising distributed route tracing information associated with each distributed database node that processed the database query along a path associated with the at least one query response; process the received distributed route tracing information to characterize query route propagation within the distributed network of databases, map the database query into a database count query and executing the database count query against a local database, identify local route tracing information based upon the at least one route tracing identifier, receive the database query from a first distributed database node and assign local first arrival precedence information associated with the first distributed database node to the local route tracing information, assign a first query path depth associated with receipt of the database query from the first distributed database node as a shortest query path depth, receive the database query from a second distributed database node different from the first distributed database node, determine a second query path depth associated with receipt of the database query from the second distributed database node, determine whether the second query path depth is different from the shortest query path depth, assign local second arrival precedence information to the local route tracing information based upon whether the second query path depth is different from the shortest query path depth, assign the second query path depth as the shortest query path depth upon a determination that the second query path depth is smaller than the shortest query path depth, combine the identified local route tracing information with the distributed route tracing information of the at least one query response, store the combined route tracing information to the memory, and return the at least one query response to at least one of a distributed database node and an application-level module.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

Figure 1:
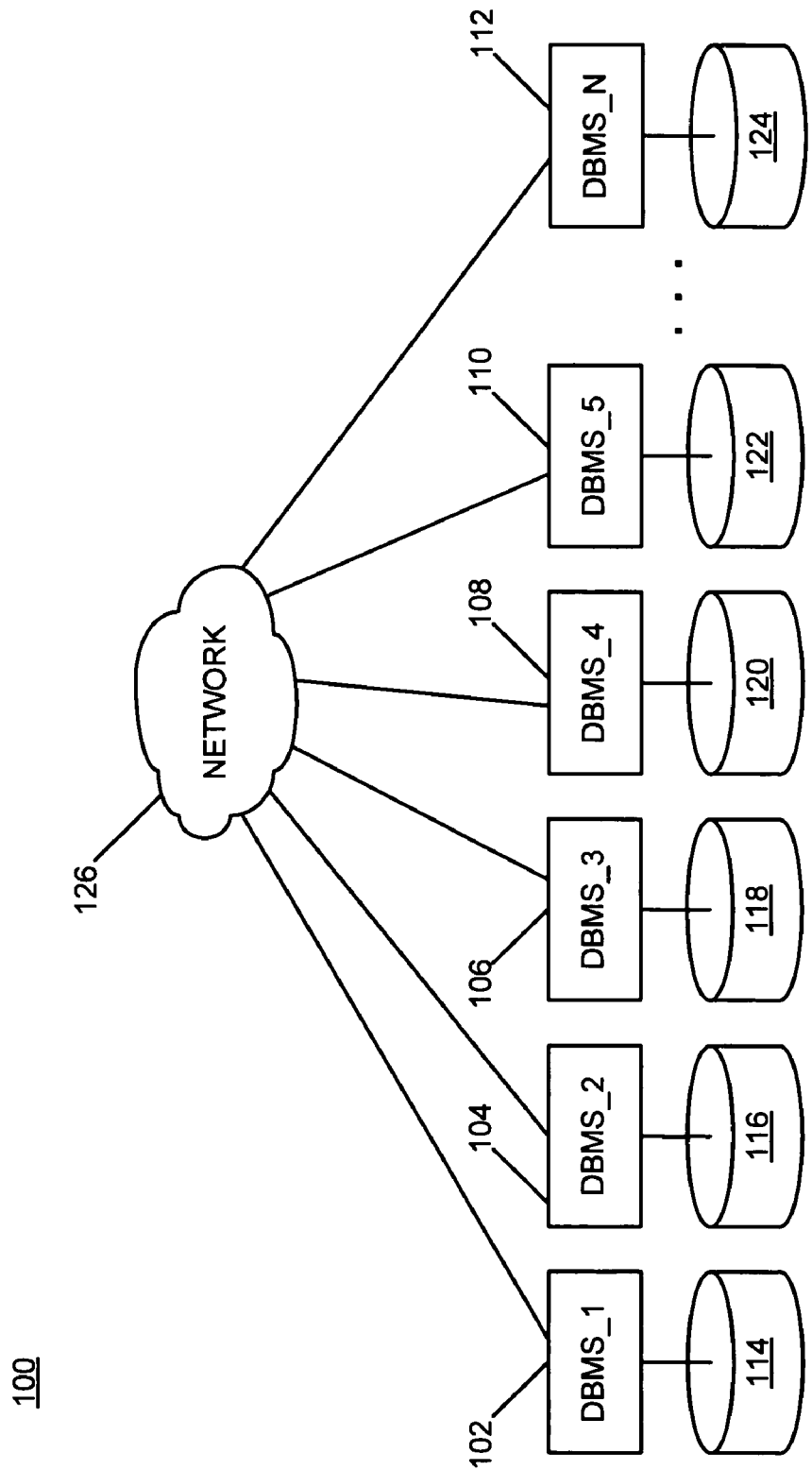
FIG. 1 is a block diagram of an example of an implementation of a system for automated query path reporting in distributed databases according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated query path reporting in ad-hoc distributed databases. For purposes of the present subject matter, "ad-hoc" encompasses systems that are fit for purposes of the present subject matter with any kind of connection strategy that may be employed. A logical data structure (e.g., table) and at least one route tracing indicator are transmitted in association with a distributed database query. A route tracing indicator includes an identifier instructing a processing node to obtain route tracing information, such as "from node," "to node," depth, precedence, and row count identifiers. A query response is received including distributed route tracing information associated with each distributed database node that processed the database query. The distributed route tracing information may include a query depth and a row count of the query for each node. The query may be received from more than one path at any node and route arrival precedence information may be determined and appended to the distributed route tracing information. The received distributed route tracing information is processed to characterize dynamic query route propagation, in one example by aggregating the received distributed route tracing information. The characterized dynamic query route propagation may be further translated into a graphical route tracing representation. Further analysis may be performed on the dynamic query route propagation to evaluate query propagation loops or other query propagation characteristics within the distributed database system.

The automated query path reporting in distributed databases described herein may be performed in real time to allow prompt reporting of query path route tracing information. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

FIG. 1 is a block diagram of an example of an implementation of a system 100 for automated query path reporting in distributed databases. Within the system 100, a database management system_1 (DBMS_1) 102, a DBMS_2 104, a DBMS_3 106, a DBMS_4 108, a DBMS_5 110, up to a DBMS_N 112 are illustrated. The DBMS_1 102 through the DBMS_N 112 are each associated with a database 114, a database 116, a database 118, a database 120, a database 122, up to a database 124, respectively. The DBMS_1 102 through the DBMS_N 112 are interconnected via a network 126.

For purposes of the present description, it should be noted that while the network 126 is illustrated as interconnecting the DBMS_1 102 through the DBMS_N 112 with each other, this should not be considered limiting. The network 126 may be formed by any interconnection appropriate for use in a distributed database environment. For example, the network 126 may include any form of interconnection suitable for the intended purpose, including a private or public network such as an intranet or the Internet, respectively, direct inter-module interconnection, dial-up, or any other interconnection mechanism capable of interconnecting the devices with the system 100.

As such, any two or more of the DBMS_1 102 through the DBMS_N 112 may be interconnected by proximity, interconnection, or routing capabilities within the system 100, while certain other of the devices may not have interconnectivity other than via other distributed database devices. Accordingly, certain of the DBMS_1 102 through the DBMS_N 112 may not be capable of communication with one another other than via the other distributed database devices.

As will be described in more detail below in association with FIGS. 2 through 6 below, the DBMS_1 102 through the DBMS_N 112 provide automated query path reporting within the system 100. The automated query path reporting in distributed databases is based upon propagation of distributed route tracing information in association with database queries.

It should be noted that the DBMS_1 102 through the DBMS_N 112 may be any type of device configurable for storage of information and distributed interconnectivity for database-style queries. For example, the DBMS_1 102 through the DBMS_N 112 may include devices such as a personal computer (e.g., desktop, laptop, palm, etc.) or a handheld device (e.g., cellular telephone, personal digital assistant (PDA), email device, music recording or playback device, etc.), or any other device capable of processing information as described above and in more detail below.

Figure 2:
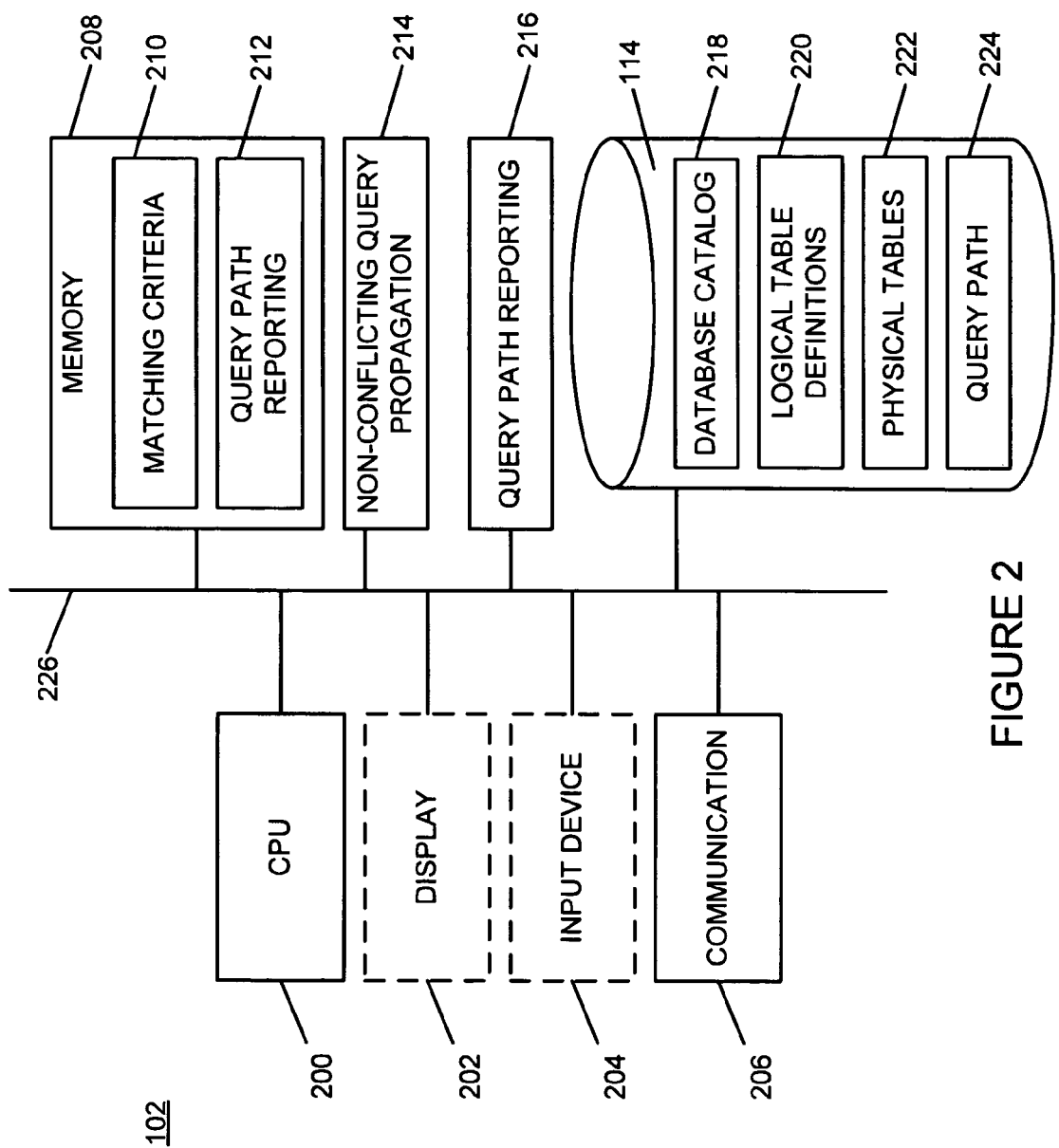
FIG. 2 is a block diagram of an example of an implementation of a database management system that is capable of performing automated query path reporting based upon propagation of distributed route tracing information in association with a database query within a distributed database system according to an embodiment of the present subject matter.

FIG. 2 is a block diagram of an example of an implementation of the DBMS_1 102 that is capable of performing automated query path reporting based upon propagation of distributed route tracing information in association with a database query within a distributed database system, such as the system 100. A central processing unit (CPU) 200 provides computer instruction execution, computation, and other capabilities within the DBMS_1 102. A display 202 provides visual information to a user of the DBMS_1 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they are not required components for the DBMS_1 102. Accordingly, the DBMS_1 102 may operate as a completely automated embedded device without user configurability or feedback. However, the DBMS_1 102 may also provide user feedback and configurability via the display 202 and the input device 204, respectively.

A communication module 206 provides interconnection capabilities that allow the DBMS_1 102 to communicate with other modules within the system 100, such as the DBMS_2 104 through the DBMS_N 112, to perform query path reporting within the system 100. The communication module 206 may include any electrical, protocol, and protocol conversion capabilities useable to provide the interconnection capabilities.

A memory 208 includes a matching criteria storage area 210 that stores information useable to identify processing preferences or priorities for non-conflicting queries within the system 100. The matching criteria stored within the matching criteria storage area 210 are used to configure and control query data selection and processing, query forwarding, and query responses. The memory 208 also includes a query path reporting storage area 212 that stores query path reporting information, usable to determine and characterize dynamic query path propagation within the system 100. As will be described in more detail below, the query path reporting information stored within the query path reporting storage area 212 is used to identify shortest query routing paths, to identify query propagation loops, and to perform other analysis on dynamic query propagation within the system 100. The query path reporting information may also be used to optimize routing within a distributed database system, such as the system 100, and to determine whether a re-distribution of data may improve query processing performance.

A non-conflicting query propagation module 214 is illustrated. The non-conflicting query propagation module 214 provides query processing, query forwarding, and query response capabilities for the DBMS_1 102. A query path reporting module 216 is also illustrated. The query path reporting module 216 provides the query path determination and characterization capabilities for distributed database devices, such as the DBMS_1 102, as described above and in more detail below.

Though the communication module 206, the non-conflicting query propagation module 214, and the query path reporting module 216 are illustrated as component-level modules for ease of illustration and description purposes, it should be noted that these modules include any hardware, programmed processor(s), and memory used to carry out the respective functions of the modules as described above and in more detail below. For example, the communication module 206, the non-conflicting query propagation module 214, and the query path reporting module 216 may include additional controller circuitry in the form of application specific integrated circuits (ASICs), processors, antennas, and/or discrete integrated circuits and components for performing communication and electrical control activities associated with the respective modules. Additionally, the communication module 206, the non-conflicting query propagation module 214, and the query path reporting module 216 also include interrupt-level, stack-level, and application-level modules as appropriate. Furthermore, these modules include any memory components used for storage, execution, and data processing for performing processing activities associated with the respective modules. The communication module 206, the non-conflicting query propagation module 214, and the query path reporting module 216 may also form a portion of other circuitry described without departure from the scope of the present subject matter.

The database 114 provides storage capabilities for information associated with the automated propagation of non-conflicting queries and query path reporting capabilities of the DBMS_1 102. The database 114 includes a database catalog storage area 218, a logical table definition storage area 220, a physical table storage area 222, and a query path storage area 224 that may be stored in the form of tables or other arrangements accessible by the DBMS_1 102.

The database catalog storage area 218 stores information associated with logical tables stored at other database management systems, such as the DBMS_2 104 through the DBMS_N 112, within the system 100. The information stored within the database catalog storage area 218 may be compiled in response to queries of other database nodes within the system 100 for logical table definitions stored at those other nodes. As such, the DMBS_1 102 may determine and store logical table definitions for other nodes within the system 100 for use during query processing.

The logical table definition storage area 220 stores information about logical tables stored locally to the DBMS_1 102. The logical tables map to physical data and physical tables stored within the physical table storage area 222. The physical table storage area 222 stores physical tables that may or may not be federated within a distributed database system, such as the system 100, based upon mappings defined within the respective logical table definition storage area 220.

The query path storage area 224 stores information associated with the received distributed route tracing information for distributed database queries as identified by the query path reporting module 216. As will be described in more detail below beginning with FIG. 3, logical table definitions are associated with database queries. Upon receipt of a database query, the receiving distributed database node, such as the DBMS_1 102, determines whether a route tracing indicator is present in association with a logical table received with the query. The route tracing indicator may be, for example, and indicator requesting a query path depth and/or a row count associated with the query. The DBMS_1 102 creates or appends distributed route tracing information and first arrival precedence to a response to the query. The query path depth represents the number of nodes that processed the query prior to the receiving node.

The receiving node also determines whether the query has been received from a different distributed database node prior to receiving the present query. In response to determining that the query has been received from a different node, a query path depth is again determined and the node compares the query path depth of the present path to a shortest query path. The shortest query path is set based upon first receipt of the query and is updated any time a second receipt of the query arrives on a shorter path. As such, the shortest path comparison provides information about routing for use in determining whether the query was later-received via a longer or a shorter query path. Second arrival precedence information is created to identify the relative precedence of the second path the query was received from and may include setting the second path as the shortest path. The arrival precedence information is appended to the created distributed route tracing information and the response is returned to the forwarding node. The query may be forwarded to any other interconnected distributed database node that has not previously sent the query to the receiving node. Upon receipt of the distributed route tracing information and any associated arrival precedence information, the originating node processes the received distributed route tracing information and any associated arrival precedence information to characterize dynamic query route propagation within a distributed network of databases, such as the system 100.

The originating node or any intermediate node may process received and locally-created route tracing information and arrival precedence information for query path reporting and analysis purposes. Any determined and/or characterized dynamic query route propagation information may be stored within the query path storage area 224 and may be forwarded to other distributed database nodes to distribute determined route tracing and reporting information.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The CPU 200, the display 202, the input device 204, the communication module 206, the memory 208, the non-conflicting query propagation module 214, the query path reporting module 216, and the database 114 are interconnected via an interconnection 226. The interconnection 226 may include a system bus, a network, or any other interconnection capable of providing the respective components with suitable interconnection for the respective purpose.

While the DBMS_1 102 is illustrated with and has certain components described, other modules and components may be associated with the DBMS_1 102 without departure from the scope of the present subject matter. Additionally, it should be noted that, while the DBMS_1 102 is described as a single device for ease of illustration purposes, the components within the DBMS_1 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the DBMS_1 102 are possible and all are considered within the scope of the present subject matter. It should also be understood that, though the database catalog storage area 218, the logical table definition storage area 220, the physical table storage area 222, and the query path storage area 224 are shown within the database 114, they may also be stored within the memory 208 without departure from the scope of the present subject matter. Accordingly, the DBMS_1 102 may take many forms and may be associated with many platforms.

Figure 3:
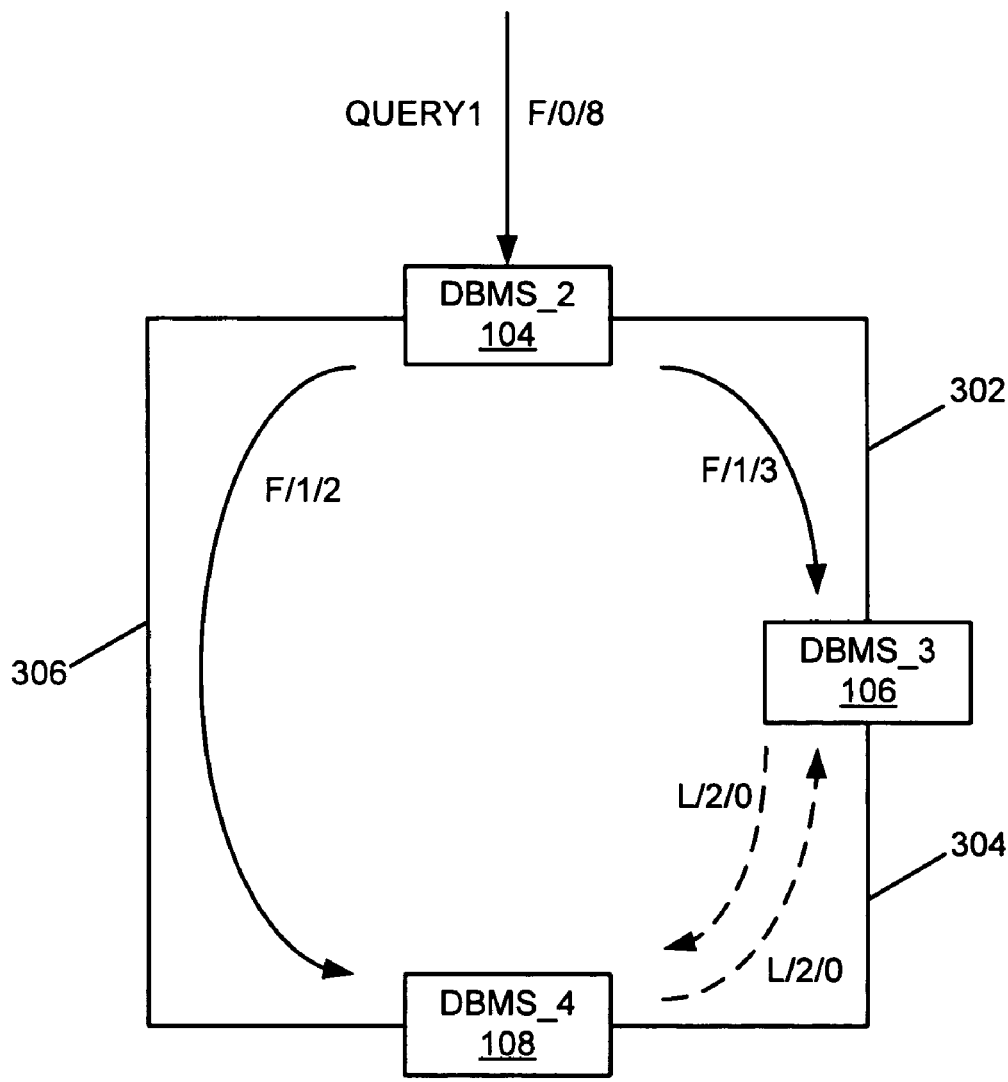
FIG. 3 is a block diagram of an example interconnection of components within the system of FIG. 1 to further illustrate an example of automated query path reporting based upon propagation of distributed route tracing information in association with a database query within a distributed database system according to an embodiment of the present subject matter.

FIG. 3 is a block diagram of an example interconnection of components within the system 100 of FIG. 1 to further illustrate an example of automated query path reporting based upon propagation of distributed route tracing information in association with a database query within the system 100. It is understood that many other types of query path reporting are possible, such as query depth reporting, and query row count reporting, query precedence reporting, and other types of query path reporting. As such, all possible types of query path reporting are considered within the scope of the present subject matter and the example of FIG. 3 provides sufficient detail for a person of skill in the art to make and use other types of query path reporting.

As can be seen from FIG. 3, the general representation of the network 126 has been replaced with a connection 302 interconnecting the DMBS_2 104 and the DBMS_3 106. Additionally, a connection 304 interconnects the DMBS_3 106 and the DBMS_4 108 and a connection 306 interconnects the DMBS_2 104 and the DBMS_4 108.

The DBMS_2 104 is shown issuing a "Query1." It is understood that the Query1 includes a logical table definition including at least one route tracing indicator, as will be described in more detail below. As can be seen from FIG. 3, the logical table definition storage areas 216 of each of the DBMS_2 104 through the DBMS_4 108 are not shown for ease of illustration purposes. However, it is understood that each distributed database node processes the Query1 upon receipt by comparing a logical table definition received with the Query1 with a locally-defined logical table definition stored within the respective logical table definition storage areas 216 to determine whether there is a match for query processing purposes. Accordingly, for purposes of the present example, it is assumed that a matching logical table exists at each of the DBMS_2 104 through the DBMS_4 108 for processing of the Query1.

Continuing with the present example, the following detailed query example elaborates upon the query path reporting associated with the present subject matter. For purposes of the present example, the Query1 issued by DBMS_2 104 is assumed to be formed as shown in the following pseudo-query format including a request for a set of columns that represent qualitative information desired from the Query1.

```
select FROM_NODE, TO_NODE, PRECEDENCE, DEPTH,
    ROW_COUNT from logical table 'LT1' as LT1 where
    COL1 < '10'          (Query1)
```

As can be seen from the pseudo-query format for the example Query1, a query is formed using a "select" query identifier. The identifiers following the select query identifier in capital letters (e.g., FROM_NODE, TO_NODE, PRECEDENCE, DEPTH, and ROW_COUNT) represent qualitative route tracing indicators that identify the qualitative route tracing information to be returned in response to the Query1.

The qualitative route tracing indicator "FROM_NODE" represents a node identifier or node name associated with the node from which the Query1 was received for any node that processes the Query1. The qualitative route tracing indicator "TO_NODE" represents a node identifier or node name associated with the node that receives and processes the Query1.

The qualitative route tracing indicator "DEPTH" represents a number of database steps (e.g., forwards of the Query1) to the node that is processing the Query1. Accordingly, for the node that originates the Query1 and executes it against its local database, the depth is considered zero (0). For a node that receives the Query1 from the originating node, the depth is considered to be one (1). For nodes that receive the query when forwarded from a node with a depth of one, the depth is considered to be two (2), etc. Accordingly, each forwarding operation increases the depth of the query path reported by one integer.

The qualitative route tracing indicator "PRECEDENCE" represents an order in which the Query1 is received for a given result row for the Query1. For example, a node that receives the Query1 may receive the Query1 from more than one distributed database node within the system 100. As such, for purposes of the present example, the first receipt of the Query1 is marked with an "F," for "first," and subsequent receipts may be marked according to characteristics of the routing traversed by the Query1 to the receiving node. If the Query1 is received on a path that is longer than the current shortest path for the Query1, this second receipt of the Query1 may be marked with an "L," for "longer." This determination may also be based upon depth of the respective queries. If the Query1 is received on a path that is shorter than the current shortest path for the Query1, this receipt of the Query1 may be marked with an "S," for "shorter." This determination may also be based upon depth of the respective queries. Accordingly, qualitative route tracing information about query routing may be documented by the receiving nodes and this information returned in response to the Query1 for query route analysis purposes. Many other types of qualitative information may be gathered at distributed database nodes and returned in response to a query path reporting operation. Accordingly, gathering and analyzing any such qualitative information is considered within the scope of the present subject matter.

The qualitative route tracing indicator "ROW_COUNT" represents a number of rows that would be returned by an actual data query executed against the logical table associated with the Query1. The row count allows qualitative information about the distribution of data within a distributed database system, such as the system 100, to be collected and analyzed. Based upon the collected information about the distribution of data, a determination may be made to re-distributed data storage within the system 100 to improve query response time or for other data processing purposes.

The Query1 instructs receiving distributed database nodes to use logical table definitions for fulfillment of the Query1 with the phrase "from logical table" within the Query1. The identified logical table is shown within single quotation marks. As such, the Query1 requests the receiving nodes to identify data and report route tracing information regarding data that would be returned for a logical table-based data query associated with a logical table named "LT1." As described above, for purposes of the present example, it is assumed that each of the DBMS_2 102 through the DBMS_4 108 has a logical table named "LT1" stored within the respective logical table definition storage area 220 that maps to physical data, such as a physical table stored within the respective physical table storage area 222. The second reference to "LT1" within the Query1 is an alias to a composite name for the logical table, again listed as "LT1" within the present example.

A query suffix "where COL1<'10'" allows a theoretical result set to be identified within the Query1 for processing at the distributed database nodes. The portion of the query suffix "COL1" identifies column one (1) of the associated logical table definition. The portion of the query suffix "<'10'" identifies a data value to be used for evaluation of the query. Within the present example, this portion of the query suffix indicates to identify rows with a data value of less than ten (10). Accordingly, upon receipt of the Query1, a distributed database node identifies column one (1) of its local logical table definition that matches the logical table name (e.g., "LT1" in the present example) and identifies a number of rows associated with the named logical table that have a data value meeting the criterion associated with the query suffix (e.g., less than ten).

It should be noted that for a data-based logical table query (as opposed to the present example for query path reporting), the identifiers after the "select" query identifiers would represent column names associated with logical table associated with the query. In such a situation, actual data would be returned in response to a query. However, for the present example of query path reporting, the logical table column names are replaced with the route tracing indicators described above and query reporting is performed based upon the identified logical table definition. Accordingly, the present example instructs the receiving nodes to process the Query1 based upon one column (e.g., COL1) of the local logical table definition without additional information associated with data type or other criteria for processing the data portion of the Query1 for query path reporting. However, it is understood that the present example may be modified to add these other types of information and functionality without departure from the scope of the present subject matter.

For purposes of the present example, it is also assumed that each of the DBMS_2 102 through the DBMS_4 108 has a certain number of rows that will match the Query1 when processed at the respective node. For this example, it is assumed that the DBMS_2 102 has three (3) rows that match the query suffix of the Query1. Likewise, it is assumed that the DBMS_3 106 has three (3) rows that match and the DBMS_4 108 two (2) rows that match. These query processing results obtained within the present query path reporting example based upon these assumptions for the number of rows that match at each of the DBMS_2 102 through the DBMS_4 108 will be described in more detail below in association with the description of the processing of the Query1 by each of the respective nodes. As an additional assumption for the present example Query1, it is assumed that each node waits for a response to be received from any forward operation of the Query1 before returning its local query results in response to receiving the Query1. As such, each of the DBMS_2 102 through the DBMS_4 108 compiles a result set including any data received from any downstream node(s) to facilitate aggregation of results for the present query path reporting example.

It should be noted that for purposes of the present description, a virtual table interface may be formed based upon the logical table definitions. The virtual table interface may be defined as a set of interfaces for representation of physical data for encapsulation and abstraction of the physical data within a distributed network of databases, such as the system 100. Class definitions may be constructed for creation and representation of the logical table definitions. For example, a class for a query may be defined in a syntactic representation, such as Java, to accept logical table name as an argument of a class constructor. A logical table definition may also be passed as a second argument to the class constructor. Upon instantiation, a query object may be created with the logical table name and definition associated with the query object. Distributed database nodes may make calls into the query object for logical table information and processing.

It should also be noted that, though the example Query1 associated with FIG. 3 does not include communicated matching criteria, it is understood that the queries may be modified to include matching criteria without departure from the scope of the present subject matter. Further, matching criteria may be either communicated with the queries or may be stored locally in advance of issuance of a query. As such, default matching criteria may be established and stored within the matching criteria storage area 210 of the memory 208 at each distributed database node. For example, default matching may be strict matching for column name, column position within a logical table, column name data type, column name data precision, and other factors. Issued queries may modify default matching criteria to pass additional or alternative matching criteria instructing the receiving distributed database nodes to match based upon the additional matching criteria or to change default matching criteria. Example additional or alternative matching criteria include matching a column name in any position of a logical table, matching data precision based upon equal or greater precision within the respective logical table definitions, and other matching criteria. There are many other possible matching criteria that may be used and all are considered within the scope of the present subject matter.

Returning to the description of the present example of FIG. 3, automated query path reporting associated with the Query1 will now be described. As described above, the Query1 is originated by the DBMS_2 104. The Query1 is processed internally by the DMBS_2 104 and is automatically propagated (e.g., forwarded) to other nodes for processing. Regarding the internal processing at the DMBS_2 104, the Query1 is compared with locally-defined logical tables to identify a local logical table named "LT1." Again, the logical table definitions associated with each of the DBMS_2 104 through the DBMS_4 108 are not shown within FIG. 3 for ease of illustration purposes. However, it is understood that the Query1 is processed locally to identify a physical table mapped by the logical table "LT1" within the physical table storage area 222 (not shown) and will result in a return of qualitative information identifying a quantity of data (e.g., row count) that would be returned and other information associated with the Query1 (e.g., FROM_NODE, TO_NODE, PRECEDENCE, and DEPTH). Additional detail associated with processing of the Query1 by the DBMS_2 104 will be described after the description of processing of the Query1 by other nodes within the present example.

Figure 5:
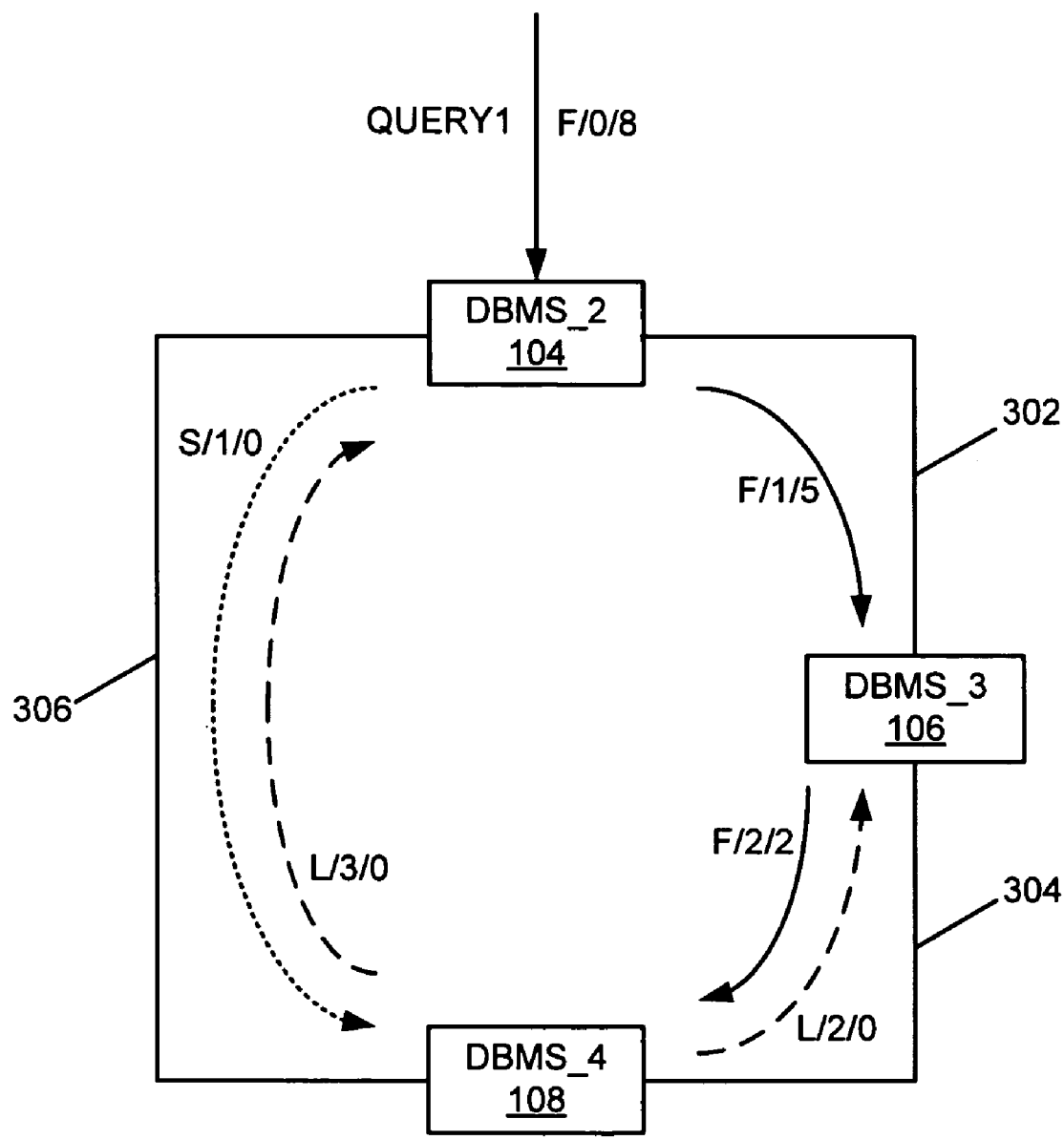
FIG. 5 is a block diagram of an example interconnection of components within the system of FIG. 1 to further illustrate an additional example of automated query path reporting based upon propagation of distributed route tracing information in association with a database query within a distributed database system according to an embodiment of the present subject matter.

It should be noted that, while no actual data values are returned from the physical or logical tables defined at the respective distributed database nodes, the qualitative information returned from each node may be used to identify characteristics of an actual logical table data-based query. As described above, the information collected may be used to determine data distribution and other organizational information about a distributed database system, such as the system 100. It should also be noted that within an ad-hoc distributed database system, a query route may differ for each execution of a query. FIG. 5 below shows an example of such a difference in routing using the query path reporting associated with the present subject matter.

For processing of the query suffix, the Query1 is forwarded to and is processed at each receiving node based upon the query suffix "where COL1<10." As such, routing and processing of the Query1 may be further controlled by use of the query suffix.

Referring to processing performed by the DBMS_3 106 upon receipt of the forwarded Query1, the DBMS_3 106 performs a variety of operations to forward and fulfill the query path reporting request associated with the forwarded Query1. The DBMS_3 106 determines whether the identified logical table definition matches a local logical table definition and identifies data associated with the first column (e.g., COL1) of that logical table definition. As described above, it is assumed that the DBMS_3 106 has a matching logical table defined. The DBMS_3 106 processes data within a physical table, such as a physical table stored within the physical table storage area 222, that is mapped by the local logical table definition for "LT1." The DBMS_3 106 identifies any rows that have data that meet any criteria associated with the query suffix described above. In the present example, it is assumed that the DBMS_3 106 has three (3) rows that match the specified criterion (e.g., COL1<10). For purposes of the present example, it is assumed that the DBMS_3 106 waits for results to be returned from the forwarded query before returning results to the DBMS_2 104.

Additionally, the DBMS_3 106 determines route precedence and route depth associated with the Query1. For the present example, the Query1 was received from the DBMS_2 104 first (e.g., prior to any receipt of the Query1 from any other distributed database node). The DBMS_3 106 assigns a route precedence of "F" (e.g., first) for receipt of the Query 1 from the DBMS_2 104. Additionally, a depth associated with the Query1 when received by the DBMS_3 106 from the DBMS_2 104 is one (1). Accordingly, an example response data set generated by the DBMS_3 106 is represented within the example Row1 of the Table1 illustrated below. The data associated with the precedence, depth, and row count are illustrated within FIG. 3 as "F/1/3."

As described above, the DBMS_3 106 forwards the Query1 to at least one other distributed database node. Within the present example, the DBMS_3 106 forwards the Query1 to the DBMS_4 108. However, for purposes of the present example, it is assumed that the Query1 reached the DBMS_4 108 from the DBMS_2 104 before it is received from the DBMS_3 106. Accordingly, processing of the Query1 by the DMBS_4 108 as received from the DBMS_2 104 will be described before the processing associated with receipt of the Query1 from the DBMS_3 106.

As such, upon receipt of the Query1 from the DBMS_2 104, the DBMS_4 108 performs processing similar to that described in detail above for the DMBS_3 106. Based upon the assumed information described above for each node, the DBMS_4 108 determines route precedence and route depth associated with the Query1. For the present example, the Query1 was received from the DBMS_2 104 first (e.g., prior to any receipt of the Query1 from any other distributed database node). The DBMS_4 108 assigns a route precedence of "F" (e.g., first) for receipt of the Query 1 from the DBMS_2 104. Additionally, a depth associated with the Query1 when received by the DBMS_4 108 from the DBMS_2 104 is one (1). In the present example, it is assumed that the DBMS_3 106 has two (2) rows that match the specified criterion (e.g., COL1<10). Accordingly, an example response data set generated by the DBMS_4 108 is represented within the example Row2 of the Table1 illustrated below. The data associated with the precedence, depth, and row count are illustrated within FIG. 3 as "F/1/2."

As described above in association with the DBMS_3 106, the DBMS_4 108 forwards the Query1 to at least one other distributed database node. Within the present example, the DBMS_4 108 forwards the Query1 to the DBMS_3 106. As such, for purposes of the present example, each of the DBMS_3 106 and the DBMS_4 108 receives the Query1 from each other. The processing described above will be performed by each of the DMBS_3 106 and the DBMS_4 108 with the following differences. Because each node has accumulated data associated with a response to the Query1, each node will not return data in response to the second receipt of the Query1 (e.g., the row count will be zero). Additionally, the precedence will be assigned based upon the Query1 being received second from each of the respective nodes. As well, the depth will be two (2) in each case of the present example because the Query1 was forwarded twice to reach each of the respective nodes.

Accordingly, an example response data set generated by the DBMS_3 106 is represented within the example Row3 of the Table1 illustrated below. Likewise, an example response data set generated by the DBMS_4 108 is represented within the example Row4 of the Table1 illustrated below. The data associated with the precedence, depth, and row count for each forward of the Query1 is identical in the present example and is illustrated within FIG. 3 as "L/2/0" for each forward of the Query1.

It should be noted that the DBMS_3 106 may receive the Query1 from either the DBMS_2 104 or from the DBMS_4 108 within the present example and a similar situation is present for the DBMS_4 108. As such, if either node has previously received the Query1 from both interconnected devices, the respective nodes determine not to forward the Query1 any further. Accordingly, within the present example, each of the DBMS_3 106 and the DBMS_4 108 will not forward the Query1 further upon a determination that they have already received and processed the Query1 from all interconnected nodes.

Additionally, because each node has determined that they have already received the Query1 and that they will not forward the Query1 to any additional node, the DMBS_3 106 and the DBMS_4 108 will begin the process of returning their respective result sets in response to processing the Query1. For the present example, the DBMS_3 106 returns two rows of query path reporting information, Row1 and Row3, as illustrated in the Table1 below. Similarly, the DBMS_4 108 returns two rows of query path reporting information, Row2 and Row4, as illustrated in the Table1 below. These result sets are returned to the DBMS_2 104 within the present example.

Local processing of the Query1 at the DBMS_2 104 will now be described. For purposes of the present example, the Query1 was not forwarded from another node to the DBMS_2 104. As such, the DBMS_2 104 assigns the name of the query (e.g., Query1) as the "FROM_NODE" for its internal processing of the Query1. The DBMS_2 104 also assigns a route precedence of "F" (e.g., first) for receipt of the Query 1 based upon it being processed locally. Additionally, a depth associated with the Query1 at the DBMS_2 104 is zero (0) because the Query1 was not forwarded by another node for processing at the DBMS_2 104. Accordingly, an example response data set generated by the DBMS_2 104 is represented within the example Row5 of the Table1 illustrated below. The data associated with the precedence, depth, and row count are illustrated within FIG. 3 as "F/0/8." The row count of eight (8) represents that three (3) rows of data were identified within the local database and that five (5) rows of data were identified at the other nodes and returned to the DBMS_2 104 within the respective result sets described above.

The Table1 below represents the data returned as result sets from all processing operations performed on the Query1. As described above, this cumulative qualitative query path reporting information may be used to identify shortest query routing paths, to identify query propagation loops, and to perform other analysis on dynamic query propagation within the system 100. The query path reporting information may also be used to optimize routing within a distributed database system, such as the system 100, and to determine whether a re-distribution of data may improve query processing performance.

TABLE 1

Cumulative Qualitative Query Path Reporting Information for First Query1

| ROW # | FROM_NODE | TO_NODE | PRECEDENCE | DEPTH | ROW_COUNT |
|---|---|---|---|---|---|
| Row1 | DBMS_2 104 | DBMS_3 106 | F | 1 | 3 |
| Row2 | DBMS_2 104 | DBMS_4 108 | F | 1 | 2 |
| Row3 | DBMS_4 108 | DBMS_3 106 | L | 2 | 0 |

TABLE 1-continued

Cumulative Qualitative Query Path Reporting Information for First Query1

| ROW # | FROM_NODE | TO_NODE | PRECEDENCE | DEPTH | ROW_COUNT |
|---|---|---|---|---|---|
| Row4 | DBMS_3 106 | DBMS_4 108 | L | 2 | 0 |
| Row5 | <Query1> | DBMS_2 104 | F | 0 | 8 |

Figure 4:
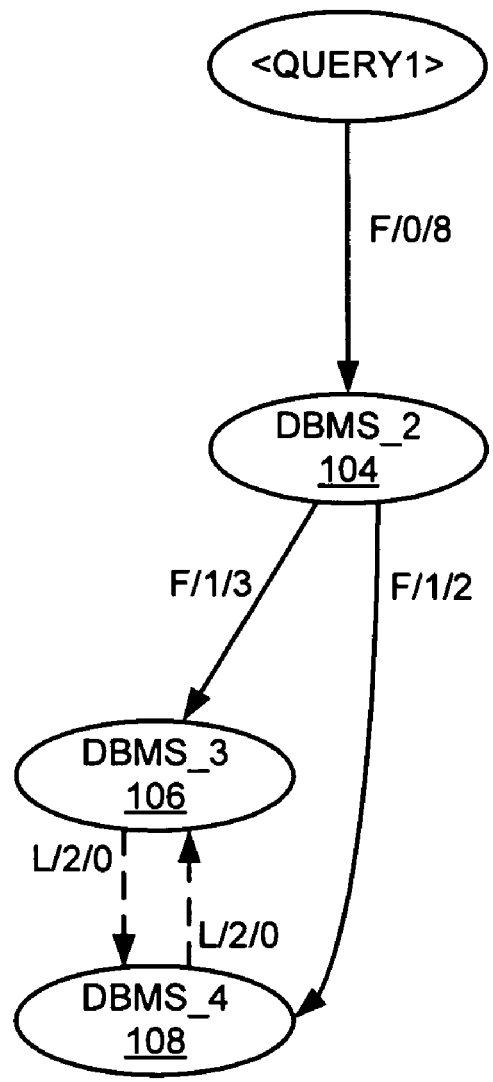
FIG. 4 is a graphical representation of an example of an implementation of a query flow diagram based upon the query path reporting information obtained within the example of FIG. 3 according to an embodiment of the present subject matter.

FIG. 4 is a graphical representation of an example of an implementation of a query flow diagram 400 based upon the query path reporting information obtained within the example of FIG. 3. As can be seen from FIG. 4, each of the DBMS_2 104 through the DBMS_4 108 is illustrated with an oval representing the node within the example query flow diagram 400. The query path reporting information from FIG. 3 is again represented. The graphical representation allows a user or system, such as the DBMS_2 104, to further process the query path reporting information obtained using the automated query path reporting in association with a database query as described herein.

For example, the graphical representation may be generated by the DBMS_2 104 or a process associated with the DBMS_2 104, such as the query path reporting module 216, by translating the received query path reporting information into the "dot" language and writing to a file named "graph.dot." The DBMS_2 104 may store the file to a memory location, such as within the memory 208 in the query path reporting storage area 212. The query path reporting module 216 may process the "graph.dot" file and draw the graphical representation on the display 202 using representations within the "graph.dot" file.

FIG. 5 is a block diagram of an example interconnection of components within the system 100 of FIG. 1 to further illustrate an additional example of automated query path reporting based upon propagation of distributed route tracing information in association with a database query within the system 100. The detailed description of FIG. 3 above provides foundation for the example of FIG. 5. Accordingly, the description of FIG. 5 below is directed toward differences between the example of FIG. 3 and the present example of FIG. 5. It is assumed that the same Query1 that was issued within FIG. 3 is re-issued from the DBMS_2 104 within FIG. 5.

As described above, the cumulative qualitative query path reporting information returned in response to the Query1 may be used to identify shortest query routing paths, to identify query propagation loops, and to perform other analysis on dynamic query propagation within the system 100. The query path reporting information may also be used to optimize routing within a distributed database system, such as the system 100, and to determine whether a re-distribution of data may improve query processing performance.

Within the present example, the following Table2 represents example data returned as result sets from all processing operations performed on the Query1. By comparison of FIG. 5 and Table2 with FIG. 3 and Table1, respectively, it can be seen that differences in processing of the Query1 occurred. As can be seen from FIG. 5 and Table2, when the Query1 was forwarded by the DBMS_2 104 to both the DBMS_3 106 and the DBMS_4 108. The Query1 reached the DBMS_3 106 first and was forwarded to and received by the DBMS_4 108 before the Query1 was received by the DBMS_4 108 from the DBMS_2 104. Accordingly, different example route processing and query path reporting information are represented as generated by each node.

TABLE 2

Cumulative Qualitative Query Path Reporting Information for Second Query1

| ROW # | FROM_NODE | TO_NODE | PRECEDENCE | DEPTH | ROW_COUNT |
|---|---|---|---|---|---|
| Row1 | DBMS_2 104 | DBMS_3 106 | F | 1 | 5 |
| Row2 | DBMS_2 104 | DBMS_4 108 | S | 1 | 0 |
| Row3 | DBMS_4 108 | DBMS_3 106 | L | 2 | 0 |
| Row4 | DBMS_3 106 | DBMS_4 108 | F | 2 | 2 |
| Row5 | DBMS_4 108 | DBMS_2 102 | L | 3 | 0 |
| Row6 | <Query1> | DBMS_2 104 | F | 0 | 8 |

As can be seen from the example Table2, while the query path reporting information returned from the DMBS_2 104 in response to the query is the same as that of the example of FIG. 3 and Table1 above, an additional row of query path reporting information was returned. As such, DBMS_2 104 query path reporting information is now in example Row6 for the Table2. It can also be seen that the example Row3 is identical between the two examples. The Row3 represents the forwarding of the Query1 from the DBMS_4 108 to the DBMS_3 106 and there is no difference in processing of this forwarded query by the DBMS_3 106 or the information returned by the DBMS_4 108.

However, because the Query1 was received by the DBMS_4 108 from the DBMS_3 106 prior to receipt from the DBMS_2 104, all other example rows within the Table2 represent different query path reporting information. As can be seen from the example Row4 of the Table2, the query path reporting information returned from the DBMS_4 108 in response to receipt of the Query1 from the DBMS_3 106 shows that the Query1 has a precedence value of "F." The precedence information represents that the Query1 was received from the DBMS_3 106 before it was received from the DBMS_2 104.

Additionally, the depth value for the Row4 is two (2) indicating that the query was forwarded twice prior to receipt at the DBMS_4 108. The depth value associated with processing of the Query1 received from the DBMS_2 104 at the DBMS_4 108 is shown within the example Row2 as one (1). This difference in depth associated with the difference in precedence result in the Row2 relative to the Row4 is represented in the Row2 with a precedence value of "S." The precedence value of "S" within the Row2 represents that the Query1 was received at the DBMS_4 108 from the DBMS_3 106 on a path with a larger depth value before the Query1 was received from the DBMS_2 104 on a path that with a smaller depth value (e.g., a shorter path). It should also be noted that because the Query1 was received at the DBMS_4 108 from the DBMS_3 106 prior to receipt from the DBMS_2 104, the Row2 shows that zero (0) rows would be returned from the DBMS_4 108 to the DBMS_2 104 in response to the a database query.

As also described above, for purposes of the present example, it is assumed that all nodes wait for the Query1 to fully propagate prior to returning the respective result sets. Additionally, each node responds with a row count value for the Query1 in response to the first receipt of the Query1. Accordingly, the Row4 of the Table2 shows that two (2) rows would be returned from the DBMS_4 108 via the Query1 received from the DMBS_3 106. These two (2) rows are added to the three (3) that would be returned from the DBMS_3 106 in response to the Query1 processed locally by the DBMS_3 106. Accordingly, the example Row1 of the Table2 shows a value of five (5) rows returned from the DBMS_3 106 to the DBMS_2 104.

Again, it should be noted that the aggregated result set shown within the example Row6 of the Table2 matches the aggregated result set shown within the example Row5 of the Table1. This would be anticipated without a change in data at the respective nodes between the sequential issuance of the Query1 within the two examples of FIG. 3 and FIG. 5.

Figure 6:
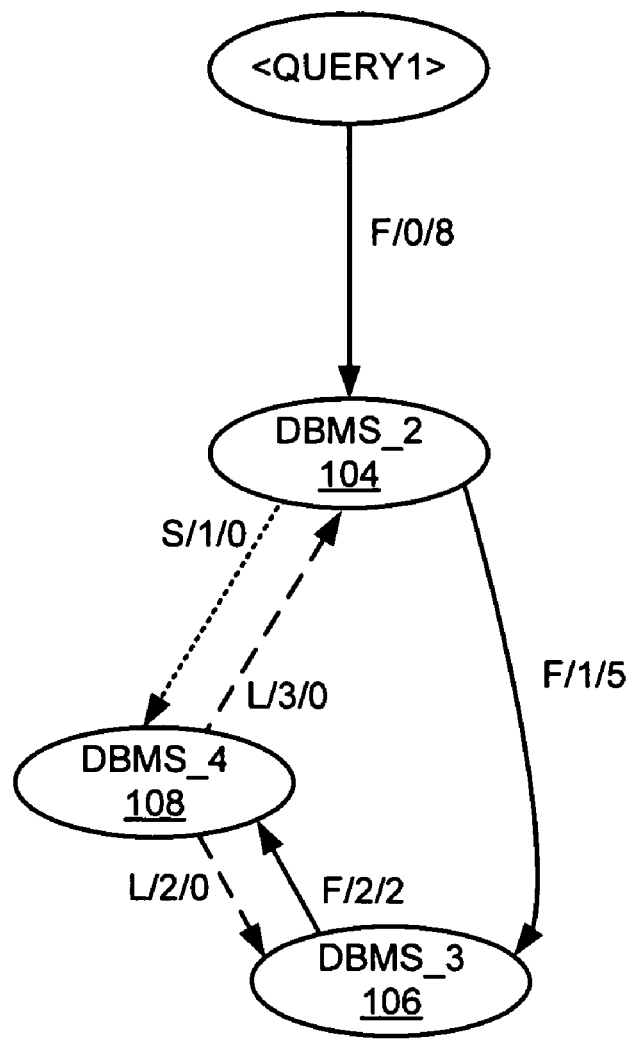
FIG. 6 is a graphical representation of an example of an implementation of a query flow diagram based upon the query path reporting information obtained within the example of FIG. 5 according to an embodiment of the present subject matter.

FIG. 6 is a graphical representation of an example of an implementation of a query flow diagram 600 based upon the query path reporting information obtained within the example of FIG. 5. As can be seen from FIG. 6, each of the DBMS_2 104 through the DBMS_4 108 is illustrated with an oval representing the node within the example query flow diagram 600. The query path reporting information from FIG. 5 is again represented. The graphical representation allows a user or system, such as the DBMS_2 104, to further process the query path reporting information obtained using the automated query path reporting in association with a database query as described herein.

For example, the graphical representation may be generated by the DBMS_2 104 or a process associated with the DBMS_2 104, such as the query path reporting module 216, by translating the received query path reporting information into the "dot" language and writing to a file named "graph.dot." The DBMS_2 104 may store the file to a memory location, such as within the memory 208 in the query path reporting storage area 212. The query path reporting module 216 may process the "graph.dot" file and draw the graphical representation on the display 202 using representations within the "graph.dot" file.

Figure 7:
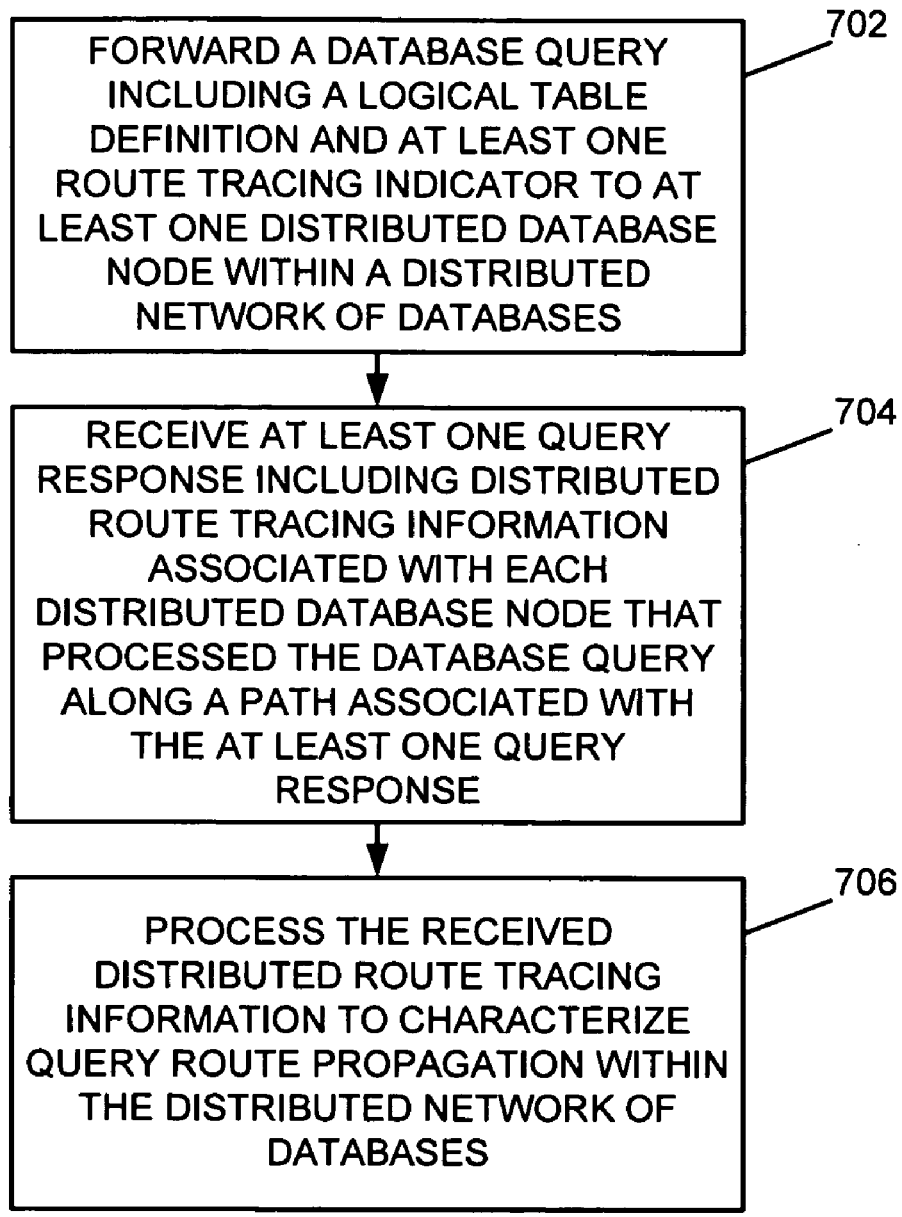
FIG. 7 is a flow chart of an example of an implementation of a process for automated query path reporting in distributed databases according to an embodiment of the present subject matter.
Figure 8:
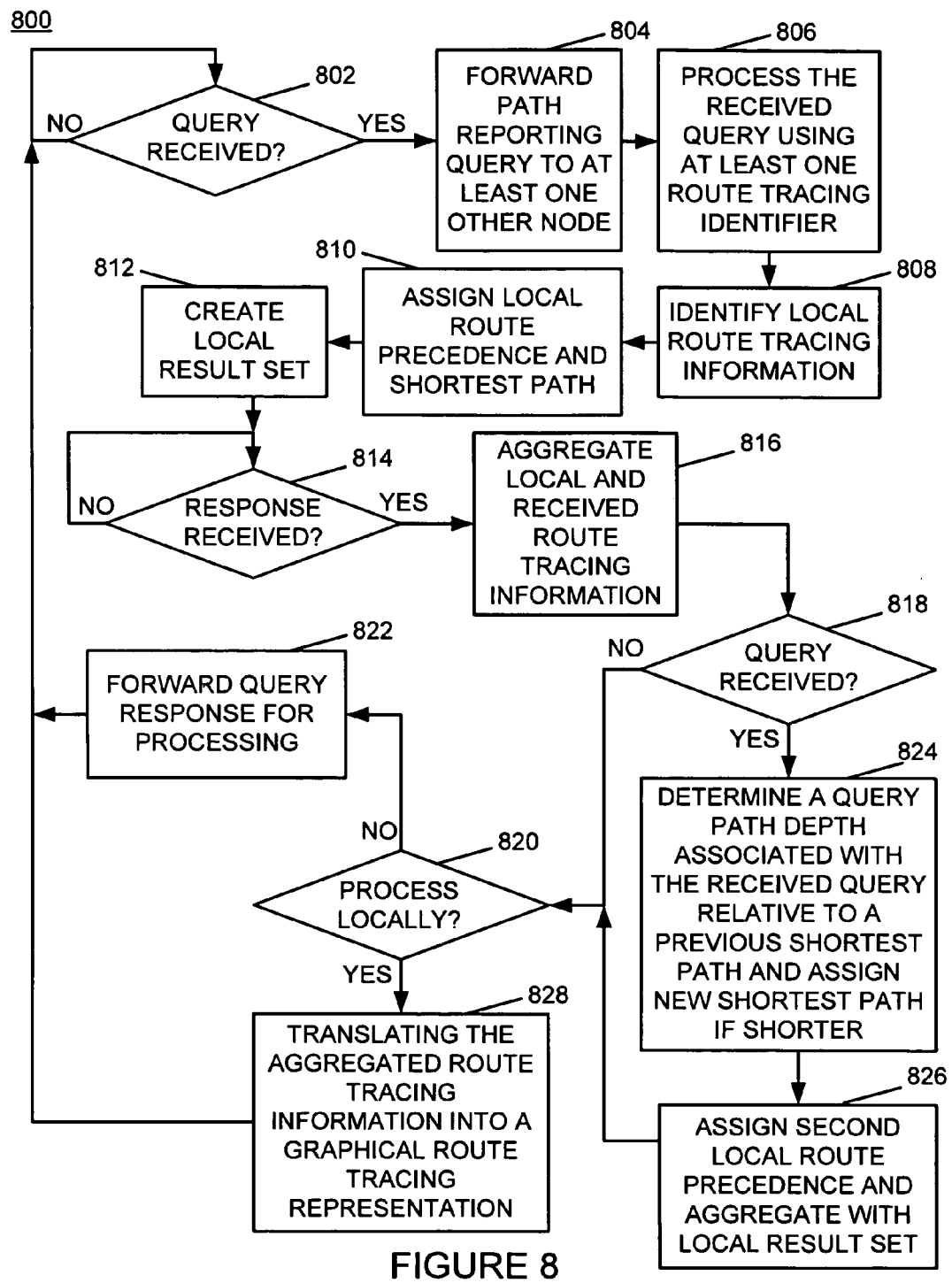
FIG. 8 is a flow chart of an example of an implementation of a process for automated query path reporting in distributed databases based upon identification and aggregation of route tracing information and query arrival precedence according to an embodiment of the present subject matter.

FIGS. 7 and 8 below describe example processes that may be executed by distributed database devices, such as the DBMS_1 102 through the DBMS_N 112, to perform the automated query path reporting associated with the present subject matter. The example processes may be performed by modules, such as the query path reporting module 216 and/or executed by the CPU 200, associated with distributed database devices. It should be noted that time out procedures and other error control procedures are not illustrated within the example processes described below for ease of illustration purposes. However, it is understood that all such procedures are considered to be within the scope of the present subject matter.

FIG. 7 is a flow chart of an example of an implementation of a process 700 for automated query path reporting in distributed databases. At block 702, the process 700 forwards a database query including a logical table definition and at least one route tracing indicator to at least one distributed database node within a distributed network of databases. At block 704, the process 700 receives at least one query response including distributed route tracing information associated with each distributed database node that processed the database query along a path associated with the at least one query response. At block 706, the process 700 processes the received distributed route tracing information to characterize query route propagation within the distributed network of databases.

FIG. 8 is a flow chart of an example of an implementation of a process 800 for automated query path reporting in distributed databases based upon identification and aggregation of route tracing information and query arrival precedence. At decision point 802, the process 800 waits for a path reporting query to be received. As described above, the path reporting query includes a logical table definition and at least one route tracing indicator. The route tracing indicator may include selection criteria, such as an indication for a "from node," a "to node," a precedence, a depth, and/or a row count, to be returned, as described above. A query may be originated at a distributed database node and processed locally or received from another distributed database node within a distributed database system, such as the system 100. Accordingly, the determination at decision point 802 may be based upon receipt of a query under any such source.

When a determination is made at decision point 802 that a query has been received, the process 800 forwards the path reporting query to at least one other distributed database node at block 804. It should be noted that, though the path reporting query is forwarded at block 804, further processing may be performed to determine whether to forward the query. For example, the query may be forwarded to satisfy a maximum depth constraint, resilience (e.g., forwarded previously but failed to execute), and for other purposes. Additional processing for these activities is not shown within FIG. 8 for ease of illustration purposes. However, it is understood than any such additional processing is within the scope of the present subject matter. At block 806, the process 800 processes the received query using the route tracing indicator(s) received with the query. Processing of the received query may include mapping the database query into a "count" query and executing the count query against a local database, such as the database 114. The count query may return a number of rows that match the count query criteria. The count query criteria may be derived from the query suffix, as described above in association with the example pseudo-query format.

At block 808, the process 800 identifies local route tracing information. The local route tracing information includes route tracing information obtained from the local distributed database node in responses to route tracing indicators requested in the query. For example, the local route tracing information may include any requested information, such as described above in association with FIGS. 3 and 5 and the Table1 and the Table2, respectively.

At block 810, the process 800 assigns a local route precedence to the received query and assigns a present query path depth as the shortest path. For purposes of the present example, the query that is being processed is the first query received. As such, the query is assigned a precedence of first (e.g., "F"). Additionally, because it is assumed for purposes of the present example that the query that is being processed is the first query received, the query path depth associated with the present query path may be assigned to the "shortest" query path without further processing. At block 812, the process 800 creates a local result set for the processed query. The result set includes at least one row of query path reporting information (e.g., row count, precedence, depth, from node, to node, etc.).

At decision point 814, the process 800 waits for a response to be received for the forwarded query. The response includes a result set associated with each node that processed the query along a path associated with the query. The response set is based upon database processing and forwarding operations at any such downstream nodes that have processed the query. For example, the response set may include distributed route tracing information and distributed arrival precedence information. The distributed arrival precedence information indicates receipt of the query by at least one downstream node from more than one node. Such a condition represents an example of a loop condition and this information may be used for subsequent query route characterization and optimization. As described above in association with other examples, for purposes of the present example, it is assumed that each distributed database node waits for a result set to be returned prior to returning any result set in response to a received query. When the process 800 makes a determination that a query response including a result set has been received at decision point 814, the process 800 aggregates the local route tracing information with the received route tracing information at block 816.

At decision point 818, the process 800 makes a determination as to whether the query received at decision point 802 has been received from another distributed database node. It should be noted that the receipt of query, including a second receipt of a query from a different distributed database node, may be asynchronous with respect to the example processing described in association with the process 800. As such, the location of the decision point 818 within the example process 800 is for ease of illustration purposes.

When a determination is made that the query has not been received from another distributed database node, the process 800 makes a determination at decision point 820 as to whether to process the aggregated result set locally to characterize dynamic query route propagation within a distributed network of databases, such as the system 100, or to forward the aggregated result set for processing at another distributed database node or at an application-level module associated with the local distributed database node. When a determination is made not to process the aggregated result set locally, the process 800 forwards the result set for processing at block 822 and the process 800 returns to decision point 802 to continue processing as described above.

Returning to the description of decision point 818, when a determination is made that the query received at decision point 802 has been received from another distributed database node, the process 800 determines a query path depth associated with the most-recently received query relative to a previous shortest path for the query and assigns the present path as the shortest path if it is shorter than the previous shortest path at block 824. Within the present example, it is assumed that the process 800 has received the query once previously at decision point 802 and that the depth of the query when received at decision point 802 is the present shortest path against which the most-recently received query is evaluated. As described above in association with FIG. 3 and FIG. 5, the difference in depth is used to determine a second local route precedence (e.g., "L" for longer or "S" for shorter). At block 826, the process 800 assigns the determined second local route precedence and aggregates the assigned second local route precedence to the local result set. It should be noted that, as described above, the route tracing information generated will have a row count of zero (0) for second and subsequent receipts of the query. The process 800 continues to decision point 820 to make the determination as to whether to process the aggregated result set locally to characterize dynamic query route propagation within a distributed network of databases, such as the system 100, or to forward the aggregated result set for processing at another distributed database node or at an application-level module associated with the local distributed database node.

Returning to the description of the decision point 820, in response to a determination to process the aggregated result set locally, the process 800 translates the aggregated route tracing information into a graphical route tracing representation at block 828. The graphical route tracing information may be displayed upon a display device, such as the display 202, or forwarded to another node or application-level module for analysis and further processing. The process 800 returns to decision point 802 to continue processing as described above.

It is further understood that additional analysis of the aggregated route tracing information may be performed to determine data distribution and other characteristics of the distributed database nodes within the system 100. For example, based upon analysis of the aggregated route tracing information, a re-distribution of data among distributed database nodes, such as the DBMS_2 104 through the DBMS_N 112, may be performed. Additional processing associated with such additional processing is not shown within FIG. 8 for ease of illustration purposes. However, it is understood that any such additional processing is considered within the scope of the present subject matter.

As such, the process 800 provides automated query path reporting in distributed databases based upon identification and aggregation of route tracing information and query arrival precedence. Distributed query route tracing information and remote arrival precedence are received in response to forwarding of a query to at least one downstream distributed database node and local route precedence is assigned to each receipt of the query. The distributed and local route tracing information including precedence information are aggregated and processed to characterize dynamic query route propagation within a distributed network of databases.

As described above in association with FIGS. 1 through 8, the example systems and processes provide automated query path reporting in distributed databases. Many other variations and additional activities associated with automated query path reporting are possible and all are considered within the scope of the present subject matter.

Those skilled in the art will recognize, upon consideration of the above teachings, that certain of the above exemplary embodiments are based upon use of a programmed processor such as CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
   forwarding a database path reporting query, comprising a logical table definition that maps to at least one physical table within at least one distributed database node and at least one route tracing indicator that specifies distributed route tracing information to be returned in response to the forwarded database path reporting query, to the at least one distributed database node within a distributed network of databases;

receiving at least one path reporting query response comprising the distributed route tracing information associated with each distributed database node that processed the forwarded database path reporting query along a path associated with the at least one path reporting query response;

processing the received distributed route tracing information to characterize query route propagation within the distributed network of databases;

identifying local route tracing information based upon the at least one route tracing indicator, where identifying the local route tracing information based upon the at least one route tracing indicator comprises:
  mapping the database path reporting query into a database count query that specifies return of a number of rows that match a count query criterion within the database count query;
  executing the database count query against a local database, where the database count query returns the number of rows of the local database that match the count query criterion; and
  forming the local route tracing information using the number of rows of the local database that match the count query criterion;

combining the identified local route tracing information with the distributed route tracing information of the at least one path reporting query response; and returning the at least one path reporting query response to at least one of a distributed database node and an application-level module.

2. The method of claim 1, where the received distributed route tracing information comprises at least one of a query depth, a row count, and a path precedence indicator associated with each distributed database node that processed the database path reporting query.

3. The method of claim 1, where forwarding the database path reporting query is performed in response to receiving the database path reporting query from a first distributed database node and further comprising:
  assigning local first arrival precedence information associated with the first distributed database node to the local route tracing information; and
  assigning a first query path depth associated with receipt of the database path reporting query from the first distributed database node as a shortest query path depth.

4. The method of claim 3, further comprising:
  receiving the database path reporting query from a second distributed database node different from the first distributed database node; and
  determining a second query path depth associated with receipt of the database path reporting query from the second distributed database node.

5. The method of claim 4, further comprising determining whether the second query path depth is different from the shortest query path depth.

6. The method of claim 5, further comprising:
  assigning local second arrival precedence information to the local route tracing information based upon whether the second query path depth is different from the shortest query path depth; and
  assigning the second query path depth as the shortest query path depth upon a determination that the second query path depth is smaller than the shortest query path depth.

7. The method of claim 1, where the received distributed route tracing information comprises distributed arrival precedence information indicating that the database path reporting query was received by the at least one distributed database node from more than one distributed database path and a query path depth indication associated with each of the more than one distributed database path.

8. The method of claim 1, where processing the received distributed route tracing information to characterize the query route propagation within the distributed network of databases comprises aggregating the received distributed route tracing information associated with each distributed database node that processed the database path reporting query and translating the aggregated distributed route tracing information into a graphical route tracing representation.

9. A system, comprising:
  a memory adapted to store data path query reporting information; and
  a processor programmed to:
    forward a database path reporting query, comprising a logical table definition that maps to at least one physical table within at least one distributed database node and at least one route tracing indicator that specifies distributed route tracing information to be returned in response to the forwarded database path reporting query, to the at least one distributed database node within a distributed network of databases;
    receive at least one query path reporting response comprising the distributed route tracing information associated with each distributed database node that processed the forwarded database path reporting query along a path associated with the at least one path reporting query response;
    process the received distributed route tracing information to characterize query route propagation within the distributed network of databases;
    identify local route tracing information based upon the at least one route tracing indicator, where in being programmed to identify the local route tracing information based upon the at least one route tracing indicator, the processor is programmed to:
      map the database path reporting query into a database count query that specifies return of a number of rows that match a count query criterion within the database count query;
      execute the database count query against a local database, where the database count query returns the number of rows of the local database that match the count query criterion; and
      form the local route tracing information using the number of rows of the local database that match the count query criterion; and
    where the processor is further programmed to:
      combine the identified local route tracing information with the distributed route tracing information of the at least one path reporting query response;
      return the at least one path reporting query response to at least one of a distributed database node and an application-level module; and
      store the processed distributed route tracing information to the memory.

10. The system of claim 9, where the received distributed route tracing information comprises at least one of a query depth, a row count, and a path precedence indicator associated with each distributed database node that processed the database path reporting query.

11. The system of claim 9, where the processor is further programmed to receive the database path reporting query from a first distributed database node and to:

assign local first arrival precedence information associated with the first distributed database node to the local route tracing information; and assign a first query path depth associated with receipt of the database path reporting query from the first distributed database node as a shortest query path depth.

12. The system of claim 11, where the processor is further programmed to:

receive the database path reporting query from a second distributed database node different from the first distributed database node; and determine a second path depth associated with receipt of the database path reporting query from the second distributed database node.

13. The system of claim 12, where the processor is further programmed to:

determine whether the second query path depth is different from the shortest query path depth;

assign local second arrival precedence information to the local route tracing information based upon whether the second query path depth is different from the shortest query path depth; and assign the second query path depth as the shortest query path depth upon a determination that the second query path depth is smaller than the shortest query path depth.

14. The system of claim 9, where the processor is further programmed to:

receive, in association with the received distributed route tracing information, distributed arrival precedence information indicating that the database path reporting query was received by the at least one distributed database node from more than one distributed database path and a query path depth indication associated with each of the more than one distributed database path.

15. The system of claim 9, where, in being programmed to process the received distributed route tracing information to characterize the query route propagation within the distributed network of databases, the processor is programmed to aggregate the received distributed route tracing information associated with each distributed database node that processed the database path reporting query and translate the aggregated distributed route tracing information into a graphical route tracing representation.

16. A system, comprising:

a memory adapted to store data path query reporting information; and a processor programmed to:

forward a database path reporting query, comprising a logical table definition that maps to at least one physical table within at least one distributed database node and at least one route tracing indicator that specifies distributed route tracing information to be returned in response to the forwarded database path reporting query, to the at least one distributed database node within a distributed network of databases;

receive at least one path reporting query response comprising the distributed route tracing information associated with each distributed database node that processed the forwarded database path reporting query along a path associated with the at least one query path reporting response;

process the received distributed route tracing information to characterize query route propagation within the distributed network of databases;

map the database path reporting query into a database count query that specifies return of a number of rows that match a count query criterion within the database count query;

execute the database count query against a local database, where the database count query returns the number of rows of the local database that match the count query criterion;

identify local route tracing information using the number of rows of the local database that match the count query criterion;

combine the identified local route tracing information with the distributed route tracing information of the at least one query path reporting response; store the combined route tracing information to the memory; and return the at least one path reporting query response to at least one of a distributed database node and an application-level module.

* * * * *